(12) United States Patent
Nakano et al.

(10) Patent No.: US 9,670,879 B2
(45) Date of Patent: Jun. 6, 2017

(54) VALVE APPARATUS

(71) Applicant: JTEKT CORPORATION, Osaka-shi, Osaka (JP)

(72) Inventors: Akira Nakano, Okazaki (JP); Toshihiko Shima, Okazaki (JP); Akio Nakamura, Okazaki (JP); Yoshiyuki Takeuchi, Gamagori (JP); Tomoya Noda, Okazaki (JP); Mutsuo Henmi, Nukata-gun (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/686,342

(22) Filed: Apr. 14, 2015

(65) Prior Publication Data

US 2015/0300295 A1 Oct. 22, 2015

(30) Foreign Application Priority Data

Apr. 22, 2014 (JP) .................... 2014-088450

(51) Int. Cl.
| | |
|---|---|
| *F16K 31/06* | (2006.01) |
| *F02M 21/02* | (2006.01) |
| *F16K 27/02* | (2006.01) |

(52) U.S. Cl.
CPC ........... *F02M 21/02* (2013.01); *F16K 27/029* (2013.01); *F16K 31/06* (2013.01);
(Continued)

(58) Field of Classification Search
CPC ............. F16K 31/0658; F16K 31/0662; F16K 31/0655; F16K 31/06; F16K 31/408; F16K 31/0693; F16K 27/029; F02M 21/02; F02M 47/027

USPC ........... 239/584, 585.1, 585.2, 585.3, 585.4, 239/585.5; 251/129.15, 129.07, 129.21, 251/129.22; 137/544, 549

See application file for complete search history.

(56) References Cited

U.S. PATENT DOCUMENTS

| | | | | |
|---|---|---|---|---|
| 5,167,442 A | * | 12/1992 | Alaze ..................... | B60T 8/365 251/129.02 |
| 5,603,483 A | * | 2/1997 | Reuter .................... | B60T 8/363 251/129.02 |

(Continued)

FOREIGN PATENT DOCUMENTS

| | | |
|---|---|---|
| CN | 201 739 610 U | 2/2011 |
| DE | 201 15 282 U1 | 12/2001 |

(Continued)

OTHER PUBLICATIONS

Sep. 10, 2015 Extended Search Report in European Patent Application No. 15163887.1.

*Primary Examiner* — William McCalister
*Assistant Examiner* — Ian Paquette
(74) *Attorney, Agent, or Firm* — Oliff PLC

(57) ABSTRACT

A valve apparatus includes a body with a supply passage for gas and a solenoid valve housed in the body. The solenoid valve includes a tubular sleeve internally having a flow passage leading to the supply passage, and a valve element and a valve seat that open and close the flow passage. The solenoid valve includes a driving portion that opens and closes the valve element. A seal member is disposed between an outer wall of the sleeve and an inner wall of the body. A tip of the sleeve on a downstream side of the valve element is exposed from the body.

8 Claims, 3 Drawing Sheets

(52) U.S. Cl.
CPC ...... *F16K 31/0655* (2013.01); *F16K 31/0658* (2013.01); *F16K 31/0662* (2013.01)

(56) References Cited

U.S. PATENT DOCUMENTS

| | | | |
|---|---|---|---|
| 5,934,520 A * | 8/1999 | Byerly | B05C 5/02 222/325 |
| 6,113,066 A * | 9/2000 | Hohl | B60T 8/363 251/129.02 |
| 2011/0175348 A1 | 7/2011 | Bogert et al. | |
| 2012/0199775 A1 | 8/2012 | Watanabe | |
| 2012/0313022 A1 * | 12/2012 | Godbillon | B60T 8/363 251/129.15 |
| 2013/0292590 A1 * | 11/2013 | Stahr | B60T 8/363 251/129.15 |

FOREIGN PATENT DOCUMENTS

| | | |
|---|---|---|
| DE | 101 30 629 C1 | 3/2003 |
| EP | 1 348 862 A2 | 10/2003 |
| EP | 2 492 559 A1 | 8/2012 |
| FR | 2 649 465 A1 | 1/1991 |
| JP | 2011-089569 A | 5/2011 |
| WO | 87/00903 A1 | 2/1987 |
| WO | 01/06164 A1 | 1/2001 |

* cited by examiner

VALVE APPARATUS

INCORPORATION BY REFERENCE

The disclosure of Japanese Patent Application No. 2014-088450 filed on Apr. 22, 2014 including the specification, drawings and abstract, is incorporated herein by reference in its entirety.

BACKGROUND OF THE INVENTION

1. Field of the Invention

The invention relates to a valve apparatus.

2. Description of Related Art

A fuel cell vehicle is equipped with a valve apparatus that controls supply of hydrogen gas from a gas tank to a fuel cell and interruption of the supply. An example of such a valve apparatus is a valve apparatus described in Japanese Patent Application Publication No. 2011-89569 (JP 2011-89569 A). The valve apparatus described in JP 2011-89569 A includes a body with a supply passage that communicates with the gas tank and a solenoid valve housed in the body. The solenoid valve has a tubular sleeve internally having a flow passage leading to the supply passage in the body, an opening and closing portion that opens and closes the flow passage in the sleeve, and a driving portion that drives the opening and closing portion so as to open and close the opening and closing portion. A downstream side opening of the flow passage in the sleeve is positioned inside the body. Inside the body, a feeding passage is formed which penetrates the body from the opening of the sleeve to an outer surface of the body. That is, high-pressure hydrogen gas contained in the gas tank is introduced into the solenoid valve via the supply passage in the body. Then, upon passing through the opening and closing portion of the solenoid valve, the gas is fed out from the opening in the outer surface of the body via the flow passage in the sleeve and the feeding passage in the body and supplied to the fuel cell. Furthermore, a seal member is disposed between an outer wall of the sleeve and an inner wall of the body. The seal member inhibits the gas in the supply passage from flowing into the feeding passage via a clearance between the sleeve of the solenoid valve and the body.

In the valve apparatus described in JP 2011-89569 A, normally, a gas pressure in the supply passage in the body is higher than a gas pressure in the feeding passage, and thus a pressure (positive pressure) based on this state is applied to the seal member. However, a pressure different from the positive pressure may be applied to the seal member depending on a variation in the gas pressure in the feeding passage. The pressure different from the positive pressure is, for example, a pressure that develops when the gas pressure in the feeding passage exceeds the gas pressure in the supply passage (counter pressure) or a pressure that develops when the gas pressure in the feeding passage rapidly decreases below the gas pressure in the supply passage (rapid decompression). When the pressure based on such a counter pressure or rapid decompression is applied to the seal member, a high load is imposed on the seal member. This leads to a shortened life of the seal member.

SUMMARY OF THE INVENTION

An object of the present invention is to provide a valve apparatus that allows a reduction in the burden on the seal member disposed between the sleeve of the solenoid valve and the body.

A valve apparatus according to an aspect of the present invention includes a body with a supply passage for gas and a solenoid valve housed in the body. The solenoid valve includes a tubular sleeve internally having a flow passage leading to the supply passage, an opening and closing portion that opens and closes the flow passage, and a driving portion that drives the opening and closing portion so that the opening and closing portion opens and closes the flow passage. A seal member is disposed between an outer wall of the sleeve and an inner wall of the body. A tip of the sleeve on a downstream side of the opening and closing portion is exposed from the body.

With this configuration, a pipe can be coupled to the tip of the sleeve exposed from the body. Thus, the coupling portion between the sleeve and the pipe is positioned outside the body, hindering gas having passed through the tip of the sleeve from entering a clearance between the outer wall of the sleeve and the inner wall of the body. Therefore, a counter pressure or rapid decompression as occurs in the related art is less likely to be applied to the seal member provided between the sleeve and the body, enabling a reduction in a burden on the seal member.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of a valve apparatus will be described below. The valve apparatus of the present embodiment is mounted in a fuel cell vehicle to control the supply of hydrogen gas to a fuel cell and interruption of the supply.

Figure 1:
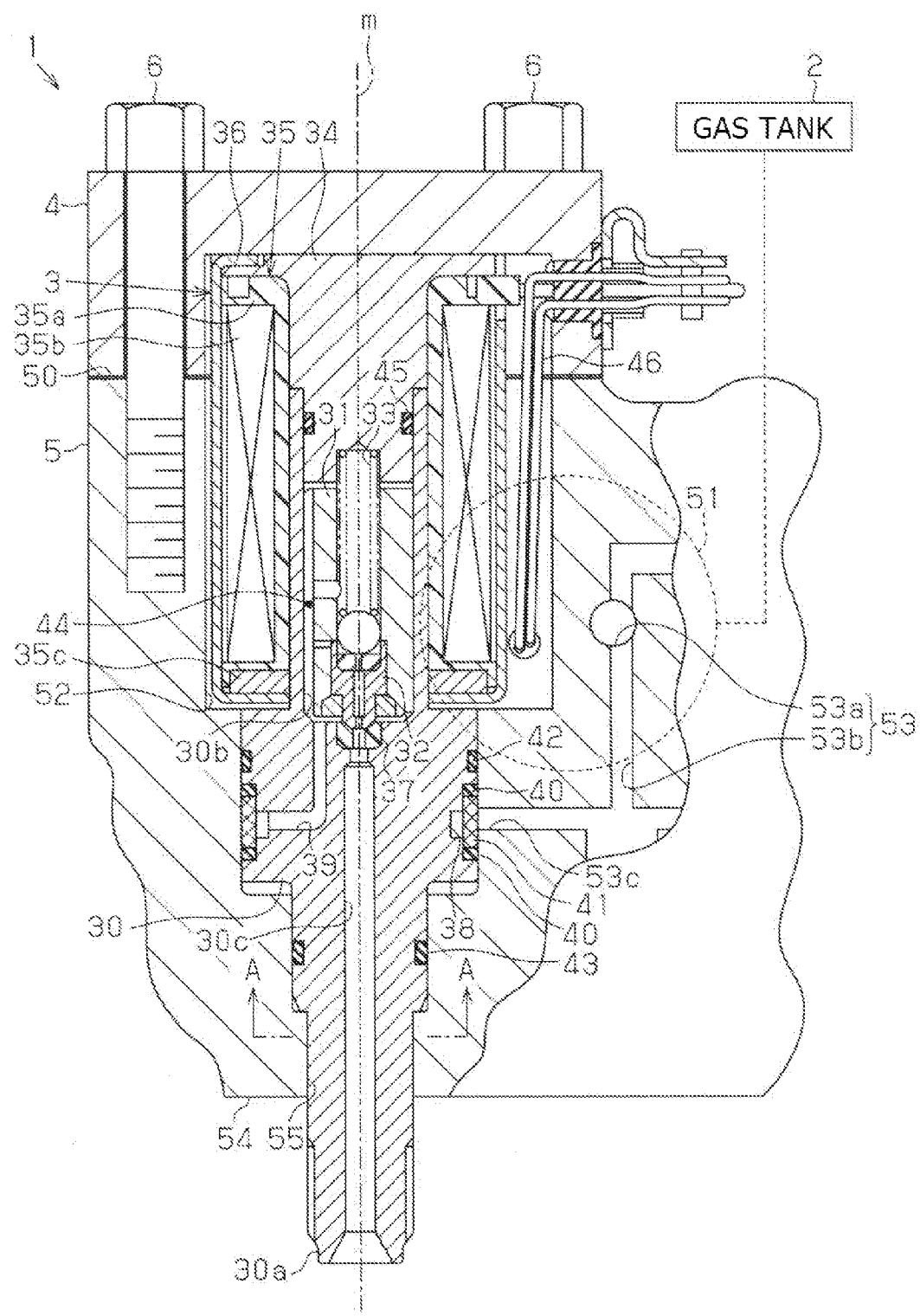
FIG. 1 is a sectional view of an embodiment of a valve apparatus depicting the sectional structure thereof.

As depicted in FIG. 1, a valve apparatus 1 is attached to a gas tank 2. The gas tank 2 is filled with hydrogen gas of a high pressure (for example, approximately 70 MPa). The valve apparatus 1 includes a solenoid valve 3 and a body 5 in which the solenoid valve 3 is housed. A part of the solenoid valve 3 is exposed from a first side surface 50 of the body 5. The part of the solenoid valve 3 that is exposed from the body 5 is covered with a cover 4. The cover 4 is fixed to the body 5 via a bolt 6.

As depicted by a dashed line in FIG. 1, a cylindrical attachment portion 51 inserted into an attachment port (not depicted in the drawings) of the gas tank 2 is formed on an outer surface of the body 5. Inside the body 5, a housing hole 52 is formed in which the solenoid valve 3 is housed, and a supply passage 53 is also formed which allows the housing hole 52 and the attachment portion 51 to communicate with each other. The housing hole 52 penetrates the body 5 from the first side surface 50 of the body 5 with which the cover 4 abuts on a second side surface 54 on the opposite side, and has an opening 55 in the second side surface 54. The housing hole 52 is a stepped round hole that is formed such that the diameter thereof gradually decreases from the first side surface 50 toward the second side surface 54 of the body 5. The supply passage 53 includes a connection passage 53a that is in communication with the attachment portion 51 and a communication passage 53b that allows the connection passage 53a and the housing hole 52 to communicate with each other. Hydrogen gas in the gas tank 2 is guided to the housing hole 52 via the attachment portion 51, the connection passage 53a, and the communication passage 53b.

The solenoid valve 3 includes a cylindrical sleeve 30, a movable iron core 31 housed inside the sleeve 30, a valve element 32 provided integrally with the movable iron core 31, a fixed iron core 34 disposed on the cover 4 side of the movable iron core 31 so as to face the movable iron core 31, and a solenoid 35 disposed around the sleeve 30. An outer periphery of the solenoid 35 is covered with a case 36.

Figure 2:
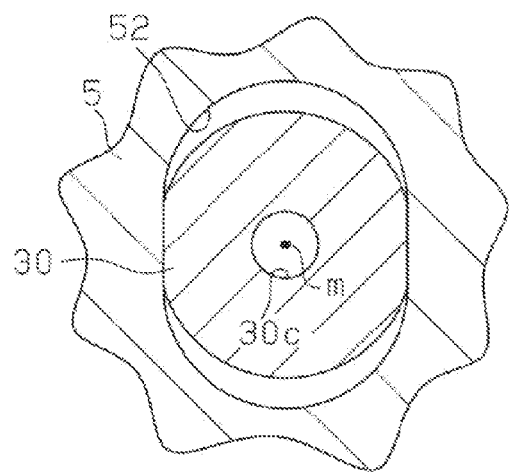
FIG. 2 is a sectional view depicting the sectional structure taken along line A-A in FIG. 1.

An outer periphery of the sleeve 30 is shaped to be stepped so as to conform to an inner periphery of the housing hole 52. The sleeve 30 is housed in the housing hole 52 so that a tip 30a of the sleeve 30 protrudes from the opening 55 in the body 5. As shown in FIG. 2 depicting the cross-sectional structure of the valve apparatus 1 taken along line A-A in FIG. 1, a part of an inner wall of the housing hole 52 and a part of an outer wall of the sleeve 30 are each formed to have an elliptical cross section. An outer peripheral portion of the sleeve 30 and an inner peripheral portion of the housing hole 52 are engaged with each other in a circumferential direction of the sleeve 30. This engagement structure locks the sleeve 30 in the circumferential direction.

As depicted in FIG. 1, in the sleeve 30, an iron core housing portion 30b is formed which has the shape of a bottomed cylinder and in which the movable iron core 31 is housed, and a flow passage 30c is also formed which penetrates the sleeve 30 from a bottom surface of the iron core housing portion 30b to the tip 30a of the sleeve 30. A valve seat 37 having an annular ring shape is fitted in an opening portion of the flow passage 30c in the bottom surface of the iron core housing portion 30b. A communication groove 38 is formed on a portion of an outer peripheral surface of the sleeve 30, which faces an opening 53c of the supply passage 53. The communication groove 38 is annularly formed along the outer peripheral surface of the sleeve 30 so as to extend from the portion of the outer peripheral surface of the sleeve 30, which faces the opening 53c of the supply passage 53, to a portion of the outer peripheral surface of the sleeve 30, which is on the opposite side of a central axis m of the sleeve 30 from the portion facing the opening 53c. Furthermore, inside the sleeve 30, an introduction passage 39 is formed which is in communication with the communication groove 38 at a position on the opposite side of the sleeve 30 from the opening 53c of the supply passage 53 and which is open in the bottom surface of the iron core housing portion 30b. That is, the supply passage 53 leads to the iron core housing portion 30b and the flow passage 30c via the communication groove 38 and the introduction passage 39. A filter 41 sandwiched between seal members 40, 40 at axially opposite ends of the filter 41 is provided at an opening portion of the communication groove 38 in the outer peripheral surface of the sleeve 30. When hydrogen gas is introduced into the communication groove 38 through the supply passage 53, dust contained in the hydrogen gas is collected by the filter 41, allowing clean hydrogen gas to be supplied to the solenoid valve 3.

In a portion of an inner peripheral surface of the housing hole 52 that is on the cover 4 side of the opening 53c of the supply passage 53, a seal member 42 is provided which includes an O ring creating a seal between the inner peripheral surface of the housing hole 52 and the outer peripheral surface of the sleeve 30. The seal member 42 inhibits gas leakage from the supply passage 53 toward the cover 4 side. Furthermore, in a portion of the peripheral surface of the housing hole 52 on a side that is more toward the opening 55 of the body 5 than the opening 53c of the supply passage 53, a seal member 43 is also provided which includes an O ring creating a seal between the peripheral surface of the housing hole 52 and the outer peripheral surface of the sleeve 30. The seal member 43 inhibits gas leakage from the supply passage 53 to the outside via the opening 55 of the body 5.

The movable iron core 31 includes a cylindrical member and is housed in the iron core housing portion 30b of the sleeve 30 with a clearance between the movable iron core 31 and the iron core housing portion 30b. The clearance between the movable iron core 31 and the iron core housing portion 30b of the sleeve 30 provides a retention chamber 44 in which hydrogen gas from the introduction passage 39 is retained. A well-known pilot valve mechanism is incorporated in the movable iron core 31. Description of the pilot valve mechanism is omitted. The valve element 32 and a coil spring 33 are housed inside the movable iron core 31. A tip of the valve element 32 protrudes from an end surface of the movable iron core 31 on the valve seat 37 side. The coil spring 33 applies to the movable iron core 31 a bias force acting in a direction toward the valve seat 37. The bias force causes the valve element 32 to be seated on the valve seat 37. The valve element 32 and the valve seat 37 constitute an opening and closing portion that opens and closes the flow passage 30c in the sleeve 30.

The fixed iron core 34 is fixed to the sleeve 30 by being press-fitted into the iron core housing portion 30b of the sleeve 30. A seal member 45 is provided between an outer peripheral surface of the fixed iron core 34 and an inner peripheral surface of the iron core housing portion 30b of the sleeve 30 to create a seal between the outer peripheral surface of the fixed iron core 34 and the inner peripheral surface of the iron core housing portion 30b.

The solenoid 35 includes a bobbin 35a fitted over the outer peripheral surface of the sleeve 30, a coil 35b housed in the bobbin 35a, and a yoke 35c fitted over the outer peripheral surface of the sleeve 30 at a radially outside position of the valve element 32. Power is fed to the coil 35b via wiring 46 led out from the inside of the cover 4. The movable iron core 31, the coil spring 33, the fixed iron core 34, and the solenoid 35 constitute a driving portion that drives the valve element 32 so as to open and close the valve element 32.

Figure 3:
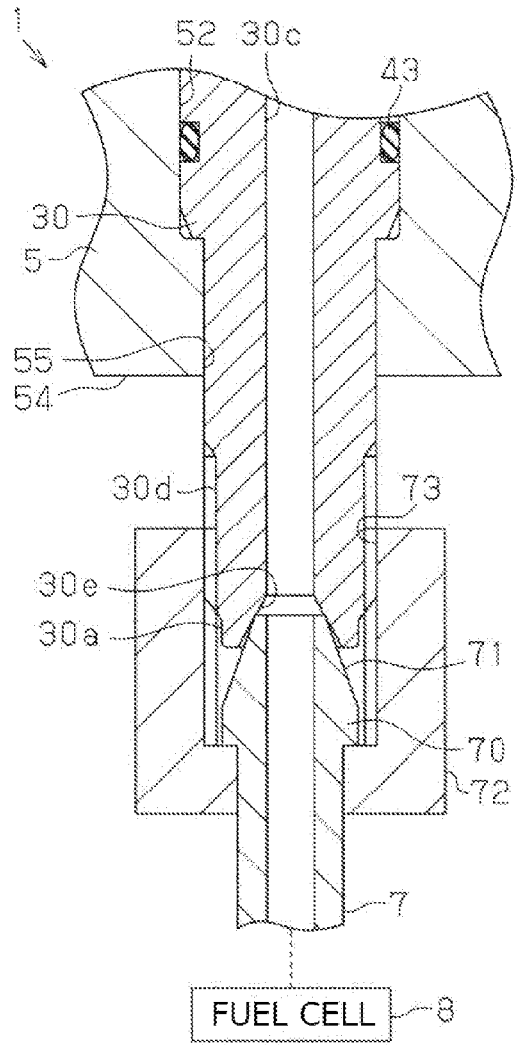
FIG. 3 is a sectional view of the valve apparatus of the embodiment, depicting a state where a pipe is coupled to a tip of a sleeve in the valve apparatus.

As depicted in FIG. 3, a pipe 7 is coupled to the tip 30a of the sleeve 30. Specifically, a thread groove 30d constituting a coupling function portion is formed on an outer peripheral surface of the tip 30a of the sleeve 30. Furthermore, a tapered surface 30e is formed on an inner peripheral surface of the tip of the sleeve 30. On the other hand, a flange portion 70 is formed on the pipe 7, and a portion 71 of the pipe 7 on the tip side of the flange portion 70 is formed to have a truncated cone shape. A tubular fastening member 72 is installed at the flange portion 70. An internal thread portion 73 is formed on an inner periphery of a tip of the fastening member 72. The pipe 7 is coupled to the sleeve 30 via the fastening member 72 by screw-threading the internal thread portion 73 of the fastening member 72 over the thread groove 30d of the tip 30a of the sleeve 30. When the internal thread portion 73 of the fastening member 72 is screw-threaded over the thread groove 30d of the tip 30a of the sleeve 30, the outer peripheral portion of the truncated cone-shaped tip 71 of the pipe 7 is pressed against the tapered surface 30e of the sleeve 30 to create a metal seal between the tip 71 of the pipe 7 and the tapered surface 30e of the sleeve 30. Hydrogen gas is fed from the valve apparatus 1 to a fuel cell 8 through the pipe 7.

Operations of the valve apparatus 1 of the present embodiment will be described.

In the valve apparatus 1, when no driving current is supplied to the coil 35b of the solenoid valve 3, the valve element 32 is seated on the valve seat 37 by the bias force of the coil spring 33 and the pressure of hydrogen gas. Therefore, the flow passage 30c of the sleeve 30 is closed, and thus no hydrogen gas is fed out from the tip 30a of the sleeve 30.

On the other hand, when a driving current is supplied to the coil 35b via the wiring 46, the movable iron core 31 is attracted to the fixed iron core 34. The valve element 32 is thus separated from the valve seat 37 against the bias force of the coil spring 33, and then, the retention chamber 44 and the flow passage 30c in the sleeve 30 are connected together. That is, the flow passage 30c is open. In this state, the hydrogen gas in the supply passage 53 is fed out to the pipe 7 via the communication groove 38, the introduction passage 39, the retention chamber 44, and the flow passage 30c and supplied to the fuel cell 8.

The above-described valve apparatus 1 of the present invention provides the following advantageous effects.

(1) In the valve apparatus 1 of the present embodiment, the tip 30a of the sleeve 30, which is located on a downstream side of the valve element 32, is exposed from the body 5, allowing the pipe 7 to be coupled to the tip 30a of the sleeve 30. Thus, the coupling portion between the sleeve 30 and the pipe 7 can be positioned outside the body 5. This hinders hydrogen gas having passed through the tip 30a of the sleeve 30 from entering a clearance between the opening 55 in the body 5 and the sleeve 30, restraining a counter pressure or rapid decompression from being applied to the seal member 43 provided between the sleeve 30 and the body 5. As a result, a burden imposed on the seal member 43 can be reduced.

(2) The thread groove 30d is formed on the outer peripheral surface of the tip 30a of the sleeve 30. Furthermore, the fastening member 72 that can be fastened to the thread groove 30d of the sleeve 30 is provided on the pipe 7. Thus, the sleeve 30 and the pipe 7 can be easily and reliably coupled together.

(3) The engagement structure between the sleeve 30 and the body 5 depicted in FIG. 2 locks the sleeve 30 in the circumferential direction. This hinders the sleeve 30 from rotating relative to the body 5 when the fastening member 72 of the pipe 7 is screw-threaded over the tip 30a of the sleeve 30. Hence, a fastening operation can be easily performed.

(4) When, for example, a fuel cell vehicle is used over a long period, a slight amount of moisture contained in the hydrogen gas may build up as water droplets gradually in the supply passage 53 in the body 5. When the water droplets enter the retention chamber 44 in the sleeve 30 and attach to the movable iron core 31, the movable iron core 31 may become rusty. In this regard, in the present embodiment, the position where the supply passage 53 and the communication groove 38 communicate with each other is on the opposite side of the central axis m of the sleeve 30 from the position where the communication groove 38 and the introduction passage 39 communicate with each other. This hinders the water droplets in the supply passage 53 from reaching the introduction passage 39. That is, the water droplets in the supply passage 53 do not easily enter the retention chamber 44, which inhibits the movable iron core 31 from becoming rusty.

The above-described embodiment may be implemented in the following forms.

In the above-described embodiment, a part of the inner wall of the housing hole 52 and a part of the outer wall of the sleeve 30 are each formed to have an elliptical cross section in order to allow the sleeve 30 to be locked. However, these may be formed to each have a polygonal cross section (for example, hexagonal cross section) or the like. In short, the wall of the housing hole 52 and the outer wall of the sleeve 30 may have such shapes that the inner wall of the housing hole 52 and the outer wall of the sleeve 30 engage with each other in the circumferential direction of the sleeve 30.

Figure 4:
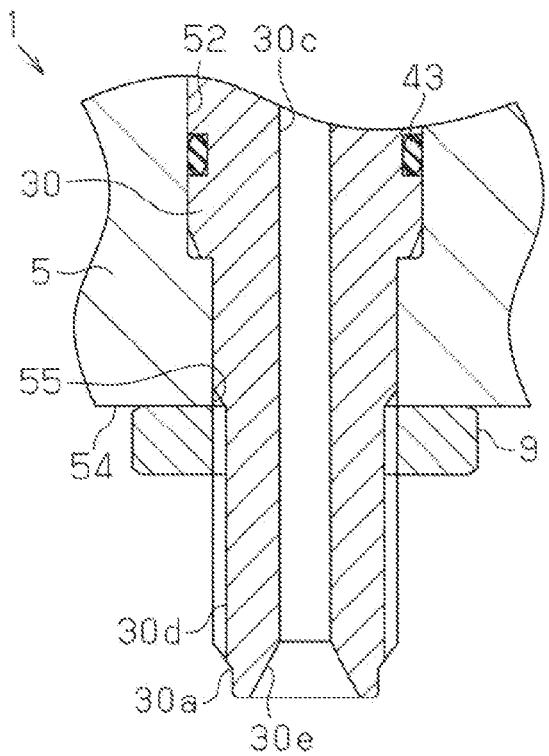
FIG. 4 is a sectional view of a modification of the valve apparatus, depicting a sectional structure of the periphery of the tip of the sleeve in the valve apparatus.

The structure for locking the sleeve 30 is not limited to the engagement structure of the inner wall of the housing hole 52 and the outer wall of the sleeve 30. For example, as depicted in FIG. 4, the thread groove 30d formed on the tip 30a of the sleeve 30 is extended to the opening 55 in the body 5, and a lock nut 9 is screw-threaded over the thread groove 30d. The sleeve 30 may be locked by fastening the lock nut 9 to fix the sleeve 30 to the body 5.

In the above-described embodiment, the position where the supply passage 53 and the communication groove 38 communicate with each other is on the opposite side of the central axis m of the sleeve 30 from the position where the communication groove 38 and the introduction passage 39 communicate with each other. However, the latter position may be disposed so as to be shifted by an angle smaller than 180° from the former position in the circumferential direction of the sleeve 30. Furthermore, the opening position of the introduction passage 39 in the outer peripheral surface of the sleeve 30 may be located so as to face the opening 53c of the supply passage 53. This configuration eliminates the need to form the communication groove 38 in the sleeve 30, allowing the structure of the sleeve 30 to be simplified.

In the above-described embodiment, as a coupling structure that connects the sleeve 30 and the pipe 7 together, the thread structure is adopted which includes the thread groove 30d of the sleeve 30 and the internal thread portion 73 of the fastening member 72. However, for example, a structure based on a quick coupling may be adopted. In short, the coupling function portion to which the pipe 7 can be connected may be provided at the tip 30a of the sleeve 30.

Figure 5:
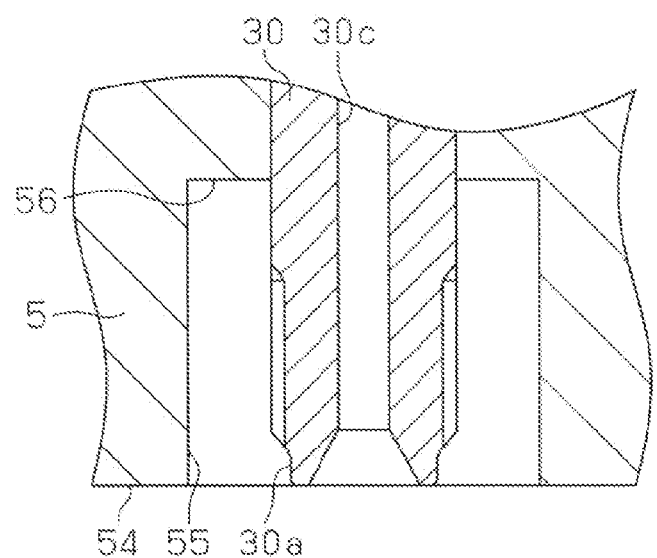
FIG. 5 is a sectional view of a modification of the valve apparatus depicting the sectional structure of the periphery of the tip of the sleeve in the valve apparatus.

In the above-described embodiment, the sleeve 30 is housed in the housing hole 52 so that the tip 30a of the sleeve 30 protrudes from the opening 55 in the body 5. However, the present invention is not limited to this embodiment. As depicted in FIG. 5, a recessed portion 56 with such a size that the fastening member 72 of the pipe 7 can be accommodated therein may be formed in the opening 55 in the body 5, and the tip 30a of the sleeve 30 may be exposed from the body 5 so that the tip 30a of the sleeve 30 protrudes into the recessed portion 56 but stays behind an opening edge of the opening 55 in the body 5.

In the above-described embodiment, the sleeve 30 is formed to be cylindrical. However, as the shape of the sleeve 30, an appropriate tubular shape, for example, a rectangular tubular shape, may be adopted.

Seal members other than the O rings may be used as the seal members 42 and 43.

The configuration of the opening and closing portion of the valve apparatus 1 is not limited to the configuration including the valve element 32 and the valve seat 37 in the above-described embodiment but may be changed as needed. Furthermore, the configuration of the driving portion of the valve apparatus 1 is not limited to the configuration including the movable iron core 31, the fixed iron core 34, and the solenoid 35 but may be changed as needed.

The valve apparatus 1 of the above-described embodiment is mounted in the fuel cell vehicle. However, the valve apparatus 1 may be mounted in any equipment other than the fuel cell vehicle. In this case, the valve apparatus 1 of the above-described embodiment may be applied as a valve apparatus for controlling the supply of gas other than hydrogen gas and interruption of the supply.

Now, technical ideas that can be understood from the above-described embodiment and modifications thereof will be described.

In the valve apparatus, the inner wall of the housing hole in the body, in which the sleeve is housed, and the outer wall of the sleeve have such shapes that the inner wall of the housing hole and the outer wall of the sleeve can engage with each other in the circumferential direction of the sleeve. This configuration hinders the sleeve from rotating relative to the body when the fastening member of the pipe is fastened to the thread groove in the sleeve. Thus, a fastening operation can be easily performed.

The valve apparatus includes the lock nut screw-threaded over the outer peripheral surface of the tip of the sleeve, and the sleeve is fixed to the body by fastening the lock nut to the sleeve. This configuration hinders the sleeve from rotating relative to the body when the fastening member of the pipe is fastened to the thread groove in the sleeve. Thus, a fastening operation can be easily performed.

What is claimed is:

1. A valve apparatus comprising:
   a body with a supply passage for gas; and
   a solenoid valve housed in the body, the solenoid valve including:
   a tubular sleeve internally having a flow passage leading to the supply passage;
   an opening and closing portion that opens and closes the flow passage;
   a tip of the sleeve on a downstream side of the opening and closing portion that is exposed from the body;
   a communication groove formed on an outer peripheral surface of the sleeve, the communication groove having an opening portion which is in communication with the supply passage;
   a filter provided at the opening portion of the communication groove, the filter being disposed between an outer wall of the sleeve and an inner wall of the body so that the filter is supported by the outer wall of the sleeve and the inner wall of the body;
   a first pair of seal members disposed between and in direct contact with the outer wall of the sleeve and the inner wall of the body, the first pair of seal members being disposed such that the filter is sandwiched between the first pair of seal members in a longitudinal direction of the sleeve;
   a driving portion that drives the opening and closing portion so that the opening and closing portion opens and closes the flow passage; and
   a second seal member disposed between the outer wall of the sleeve and the inner wall of the body.

2. The valve apparatus according to claim 1, wherein
   the sleeve further includes an introduction passage that allows the communication groove and a flow passage in the sleeve to communicate with each other, and the communication groove is formed along the outer peripheral surface of the sleeve so as to extend from a portion of the sleeve at which the communication groove communicates with the supply passage to a position on the opposite side of a central axis of the sleeve.

3. The valve apparatus according to claim 1, wherein a coupling function portion to which a pipe is connectable is provided at the tip of the sleeve.

4. The valve apparatus according to claim 3, wherein
   the coupling function portion includes a thread groove formed on an outer peripheral surface of the tip of the sleeve, and
   the thread groove is configured so as to allow a fastening member provided on the pipe to be fastened to the thread groove.

5. A valve apparatus comprising:
   a body with a supply passage for gas; and
   a solenoid valve housed in the body, the solenoid valve including:
   a tubular sleeve internally having a flow passage leading to the supply passage;
   an opening and closing portion that opens and closes the flow passage;
   a tip of the sleeve on a downstream side of the opening and closing portion that is exposed from the body;
   a communication groove formed on an outer peripheral surface of the sleeve, the communication groove having an opening portion which is in communication with the supply passage;
   a filter provided at the opening portion of the communication groove, the filter being disposed between an outer wall of the sleeve and an inner wall of the body so that the filter is supported by the outer wall of the sleeve and the inner wall of the body;
   a tapered surface is formed on an inner peripheral surface of the tip of the sleeve such that a cross sectional area of the flow passage increases continuously to the tip of the sleeve;
   a driving portion that drives the opening and closing portion so that the opening and closing portion opens and closes the flow passage; and
   a seal member disposed between the outer wall of the sleeve and the inner wall of the body.

6. The valve apparatus according to claim 5, wherein
   the sleeve further includes an introduction passage that allows the communication groove and a flow passage in the sleeve to communicate with each other, and the communication groove is formed along the outer peripheral surface of the sleeve so as to extend from a portion of the sleeve at which the communication groove communicates with the supply passage to a position on the opposite side of a central axis of the sleeve.

7. The valve apparatus according to claim 5, wherein a coupling function portion to which a pipe is connectable is provided at the tip of the sleeve.

8. The valve apparatus according to claim 7, wherein
   the coupling function portion includes a thread groove formed on an outer peripheral surface of the tip of the sleeve, and the thread groove is configured so as to allow a fastening member provided on the pipe to be fastened to the thread groove.

\* \* \* \* \*